Patented Sept. 11, 1928.

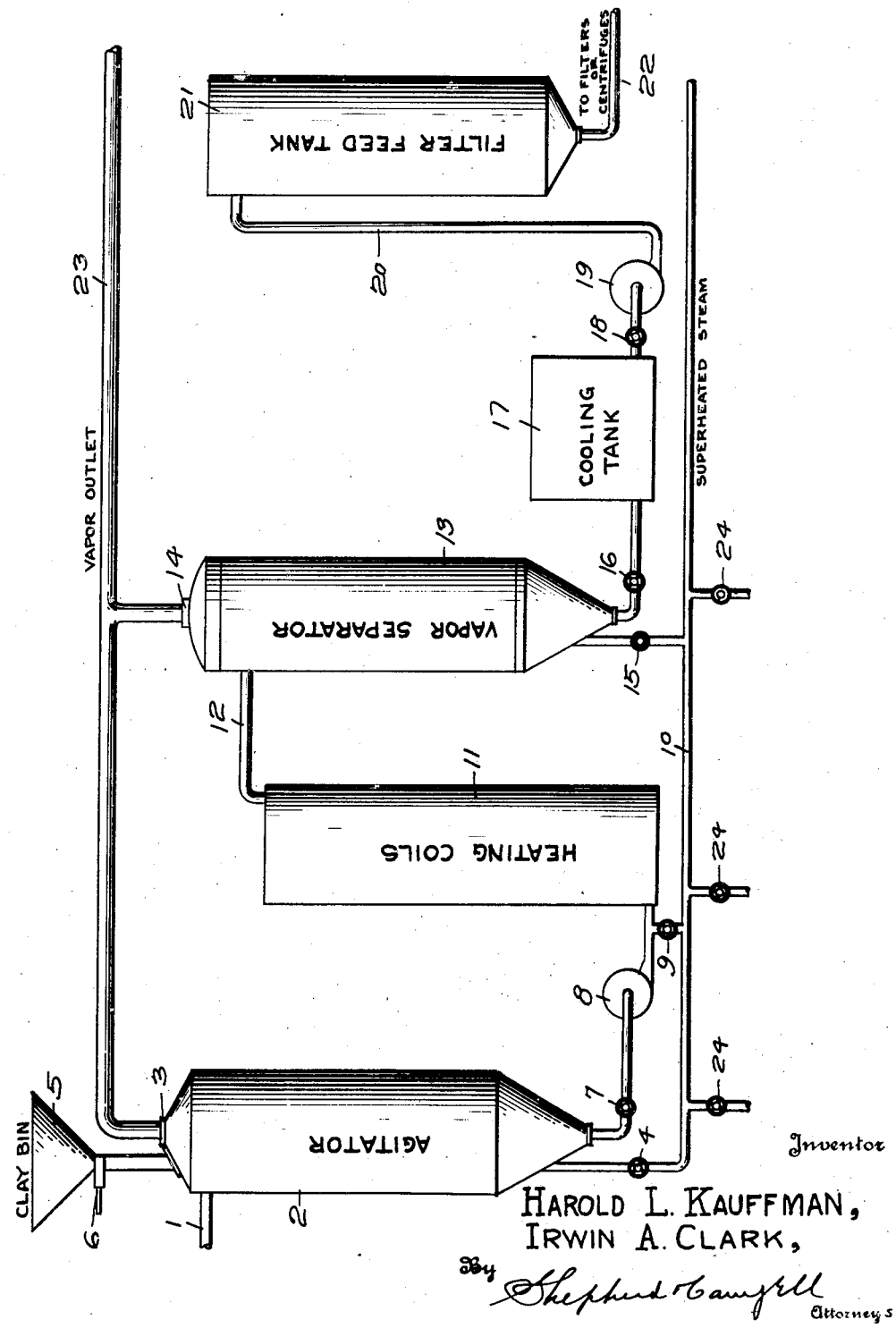

1,684,035

UNITED STATES PATENT OFFICE.

HAROLD LESTER KAUFFMAN AND IRWIN ARTHUR CLARK, OF PARCO, WYOMING, ASSIGNORS, BY MESNE ASSIGNMENTS, TO HAROLD L. KAUFFMAN.

ART OF DECOLORIZING, CLARIFYING, AND PURIFYING PETROLEUM OILS.

Application filed November 28, 1924. Serial No. 752,697.

This invention relates to improvements in the art of decolorizing, clarifying and purifying petroleum oils by the use of untreated or finely divided clays and similar filtering materials. Although this invention is not limited to any particular petroleum product it refers more especially to lubricating oils derived from crude oils of the Rocky Mountain region.

The term clay in this invention is used in a broad sense to include fuller's earths, diatomaceous earths, clays of the kaolin and related groups, bentonite and other altered volcanic ashes, tuffs, breccias and pyroclasts, and clay minerals such as halloysite, montmorillonite, pyrophyllite, leucite, etc., and other filtering materials of similar characteristics.

The coloring matter of petroleum oils, more particularly lubricating oils, is due mainly to the presence of substances of a bituminous or asphaltic nature, as well as to the presence of various complex sulphur and nitrogen compounds. In addition to these substances it is also very probably due to various colloidal and dissolved impurities such as finely divided and colloidal carbon, complex tarry compounds of high molecular weight, etc.

The removal of substances producing color in a petroleum oil is generally understood to be dependent upon the phenomenon known as adsorption. Adsorption consists in the removal from a solution a part of the solute when a solid body is introduced therein. Where adsorption is possible the free layer of the solution possesses a concentration differing from the body of the solution, while at the same time there takes place a change in concentration with a resulting great decrease of the surface tension. Furthermore, if the latter is decreased in the solvent by an increase in the concentration of the dissolved substance, the latter will try to concentrate in the surface layer. By the surface layer is meant every surface that divides the solution from some other substance, either solid, liquid or gaseous. Hence, if a solid body is introduced into a solution, a new surface is created, and if the surface tension of the solution at the surface of contact with the introduced substance is so influenced by the dissolved substance that it becomes smaller with the increase in concentration of the latter, then an increase in concentration of the dissolved substance will take place at the surface of contact. If the solution is removed from the solid body, the layer with the high concentration of solute remains attached to the solid body. In other words the solid body has adsorbed a portion of the solute, and the solution that remains is now less concentrated that it was originally. This is the most generally accepted physical explanation of the adsorption process.

However, when a decolorizing agent is introduced into a petroleum oil there also take place certain changes in the oil itself that are of a chemical nature, such as polymerization of tarry, asphaltic and bituminous substances, unsaturated hydrocarbons, etc. The adsorbent, therefore, acts also as a polymerizing agent.

The usual method employed in improving the color of petroleum oils, particularly lubricating oils, is to percolate the oil, with or without the aid of pressure, through a column of coarse fuller's earth, thereby removing part of the coloring matter and solid particles in the oil. Heavy oils are sometimes diluted with gasoline, or other solvent, to facilitate percolation through the clay. A 16-30 mesh clay is usually used on heavy oils while a 30-60 mesh clay is more efficient on the light oils. The disadvantages of this process lie mainly in the fact that several days are required for complete utilization of the clay and it is impossible to get the entire through-put to a uniform color without blending, since fractions are obtained that vary greatly in color.

It has long been known in the art that by mixing an oil with a decolorizing agent the process of decolorizing and purifying the oil is accomplished in a much shorter period of time than by the process of percolation. More efficient results are obtained in this process by the use of finely divided filtering material of form 100 to 200 mesh, since more adsorptive surface is offered to the oil to be treated with the same amount of clay. The clay and oil are usually mechanically intermixed, heated to the temperature at which the maximum adsorptive capacity of the clay is reached and the spent clay is then separated from the oil by any suitable means, either before or after the mixture is cooled.

We have discovered by practical experimentation on clays that have come under our observation, particularly those clays found in the Rocky Mountain region, that to be used most effectively they should be commingled with the oil to be treated by the aid and in the presence of superheated steam and the mixture should be agitated with superheated steam throughout the treating process.

We have also found that in treating certain oils an even higher efficiency is obtained by the addition of certain substances of an organic or inorganic composition which have no practical value under ordinary treating conditions in increasing the efficiency of filtering materials, but which we have found to be of decided value when intermixed with the oil and clay in the presence of superheated steam. We do not wish to limit ourselves to any particular substance or substances, nor the quantity of the same that is to be added to the mixture, because of the varying effects of different substances when intermixed with various oils and filtering materials. However, by way of illustration we may mention zinc chloride which we have used successfully and to an economic advantage when intermixed with clays of the Rocky Mountain region in the presence of superheated steam in treating oils derived from crude oils of this same region. It is to be understood that the invention is not limited to the use of zinc chloride but that the use of any material having the characteristics defined above or which exert an advantageous action in the presence of superheated steam which they would not otherwise have, is within the scope of the invention. All such materials are included in the term catalyst as used in the appended claims.

We are not fully aware of all the reasons for the increased efficiency obtained by applying filtering materials to oils in the presence of superheated steam but we believe that the effect of superheated steam on a filtering material is to enormously increase the adsorptive surfaces of the clay by clearing the microscopic channels of the internal structure of the material of adsorbed gases and water soluble salts, thereby increasing its efficiency.

Furthermore, we believe that the commingling of superheated steam with the oil-clay mixture, thereby increasing the surface layer of the oil with a resultant decrease of the surface tension, and thus further concentrating the dissolved impurities in the free layer of the oil, renders a larger percentage of these impurities more susceptible to adsorption.

Still further we believe that superheated steam aids in polymerizing the unsaturated, asphaltic and bituminous substances in the oil into larger molecular residues thereby rendering them more susceptible to adsorption by the filtering material.

Adsorbed impurities cannot be removed by washing but can be removed by displacement by other substances and in equal quantities. This, however, is a mass action. It is evident that the impurities of petroleum oils have greater affinity for the adsorptive surfaces of solid substances than do the individual molecules of water making up superheated steam. However, these impurities once adsorbed can be replaced by hot water or steam when in excess due to mass action as shown in recovering spent clay in this manner. It is possible that when these asphaltic and bituminous substances are adsorbed on the surface of a solid particle they are not only polymerized into larger molecular residues but are also lumped together in large particles, which, when displaced by steam, are removeable from the oil by subsequent filtration and the solid particles of the filtering material thus freed of the adsorbed impurities will again adsorb more impurities from oil as they come into contact with the oil again during agitation. Thus a continuous cycle is established which is limited only by the ultimate decrease of the concentration of the dissolved impurities to a point where the influence of the solid particles of the adsorbent on the concentration of these dissolved impurities in the surface layer of the oil is not sufficient for adsorption to take place. Such a cycle of adsorption, displacement and repeated adsorption could reach this ultimate point of low concentration only under the most ideal conditions, impossible with the complex composition of petroleum oils, but we believe such changes do take place to an extent that greatly increases the decolorization of oils so treated.

Further, the adsorption of impurities by particles of the clay may also be due to the fact that in acid solutions, i. e., acid treated oils, asphaltic material is positively charged; while, in contact with water or steam, the adsorbent becomes negatively charged and an asphaltic particle attempting to diffuse into the body of the solid particle of the adsorbent will pass into the capillary opening and may have its positive electrical charge neutralized by the negative charge of the clay and be deposited on it.

In general the action of a catalytic agent is not fully understood, but we are of the opinion however, that, when used in our process, one or more of the following actions take place; First: that the catalyst or catalytic agent in the presence of superheated steam tends to polymerize more rapidly and completely the unsaturated, asphaltic, tarry, bituminous and similar substances into forms of higher molecular residues, thereby rendering these materials more susceptible to adsorption.

Secondly, the catalyst in the presence of the superheated steam may effect the surface of the adsorbent in such a manner as to increase its influence on the surface tension of the oil, thereby increasing the concentration of the soluble impurities in the surface layer of the oil, so that when the solution is removed from the solid adsorbent more of the soluble impurities will remain attached to the adsorbent and be removed from the oil.

The preferred process of our invention is more readily understood by referring to the accompanying drawings which illustrate, diagrammatically, the form of an apparatus by which the preferred process of our invention may be conducted.

In the drawing 1 represents a connecting line from the oil storage tank to the agitator 2. This tank may be open at its top but it is preferably closed and connected at (3) to a vapor outlet line 23. 4 represents a valve in the superheated steam line through which steam enters the agitator 2. 5 is an overhead clay feed bin or hopper from which the filtering material is introduced into the agitator 2 through the slide valve 6. The agitator is discharged through valve 7 and pump 8 into the heating coils 11, from which the heated mixture passes into the vapor separator 13 through pipe 12. 9 represents a valve through which steam is admitted into the heating coils from steam line 10. 14 represents the vapor outlet from the separator into the vapor line 23. The oil and clay mixture is steamed down in the separator 13 by steam admitted from steam line 10 through valve 15. The vapor separator 13 is discharged through valve 16 into the cooling tank 17 and from there to the filter feed tank 21 through valve 18, pump 19 and connecting pipe 20. From the feed tank the mixture is fed through pipe 22 to the filters, centrifuges or other mechanical device for separating the spent filtering material from the oil. 24 represents bleeders on the superheated steam line to insure dry steam entering the agitator, heating coils and vapor separator.

With the apparatus in the form shown in the drawing the process is conducted as follows: The oil to be treated is admitted to agitator 2 and the proper amount of filtering material, with or without a catalytic agent, is added from the bin by opening the slide valve 6. As the oil is being admitted to the agitator 2, mixing is effected by admitting superheated steam into the bottom of agitator 2 through valve 4. When the oil and filtering material are thoroughly intermixed by steam agitation, with or without mechanical agitation, the mixture is discharged from the agitator 2 through valve 7 and forced by pump 8 through the heater 11 in the presence of superheated steam admitted through valve 9. The rate of flow is maintained as low as possible without heating the mixture to a temperature in excess of the boiling point of the oil being treated. From the heating unit the mixture passes through pipe 12 into the vapor separator 13 where it is further agitated or steamed down with superheated steam to a temperature somewhat in excess of that of boiling water, the steam and vapors escaping through the outlet 14. From the separator 13 the hot oil and clay mixture is discharged through valve 16 and passed through the cooling tank 17, or other suitable cooling device, where the mixture is cooled to the temperature desired for filtering. From the cooling tank 17 the cold or semi-cooled oil and clay mixture is pumped into the filter feed tank 21 from which it is fed to filters, centrifuges or other mechanical device for removing the spent filtering material from the oil. At no time during the process is the oil heated to a temperature in excess of 200° Fahrenheit except when mingled with or under an atmosphere of steam.

What we claim is:

1. An improved process of decolorizing, clarifying and purifying petroleum oils by the use of untreated finely divided clays and similar filtering materials which consists in admixing with the oil such finely ground filtering material by agitating the mixture with superheated steam, passing the oil and clay mixture through a suitable heating device along with superheated steam slowly and without heating the mixture to a temperature in excess of the boiling point of the oil being treated, steaming down the hot oil and clay mixture to a temperature somewhat in excess of the boiling point of water, further cooling the mixture to the desired temperature for separating the spent filtering material from the oil and then separating the spent filtering material from the oil.

2. An improved process of decolorizing, clarifying and purifying petroleum oils by the use of untreated finely divided clays and similar filtering materials which consists in admixing with the oil such a finely ground filtering material containing zinc chloride in the presence of superheated steam, agitating the mixture of oil and filtering material with superheated steam, passing the oil and clay mixture through a suitable heating device along with superheated steam without heating the mixture to a temperature in excess of the boiling point of the oil being treated, steaming down the hot oil and clay mixture to a temperature somewhat in excess of the boiling point of water, further cooling the mixture to the desired temperature for separating the spent filtering material from the oil and then separating the spent filtering material from the oil.

3. An improved process of decolorizing, clarifying and purifying petroleum oils by the use of untreated finely divided clays and similar filtering materials which consists in admixing with the oil such finely ground filtering material containing zinc chloride in the presence of superheated steam, agitating the mixture of oil and clay with superheated steam, heating the oil and clay mixture to a temperature above the boiling point of water but not in excess of the boiling point of the oil being treated, cooling the mixture to the desired temperature for separating the spent filtering material from the oil and then separating the spent filtering material from the oil.

In testimony whereof we hereunto affix our signatures.

HAROLD LESTER KAUFFMAN.
IRWIN ARTHUR CLARK.